Jan. 25, 1966 E. F. BECKMAN 3,231,305
COLLAPSIBLE COVER ASSEMBLY FOR VEHICLES
Filed Sept. 3, 1964 3 Sheets-Sheet 2
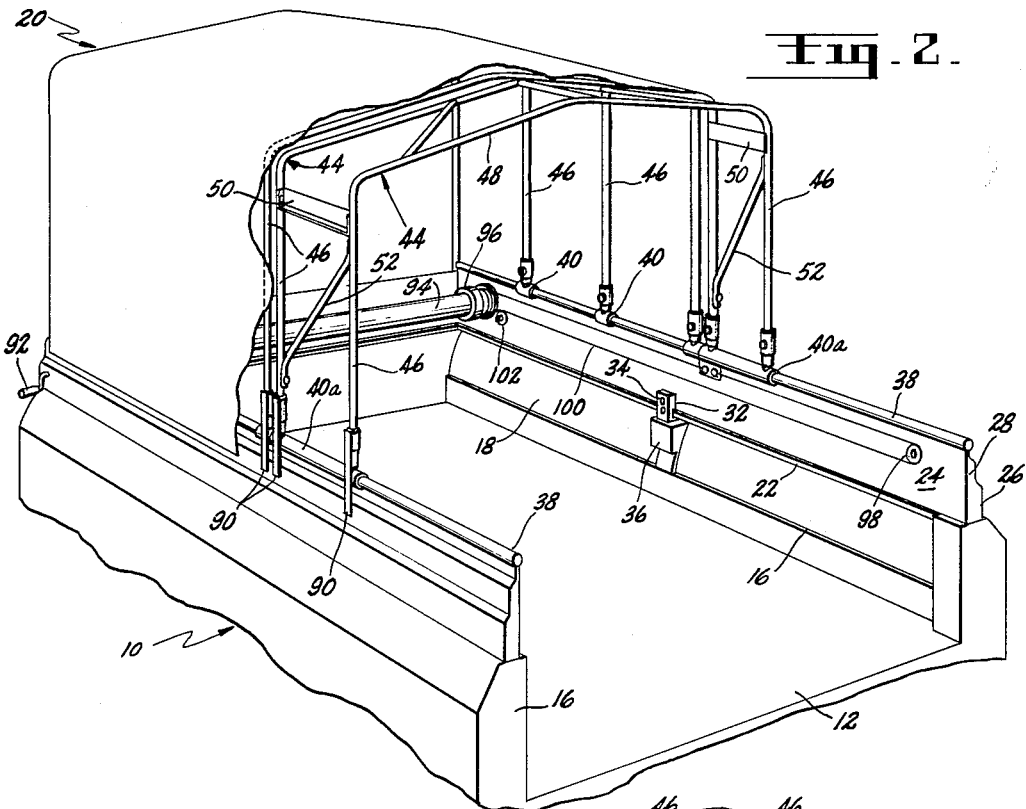
INVENTOR.
ELMER F. BECKMAN
BY
Meyers & Peterson
ATTORNEYS Jan. 25, 1966    E. F. BECKMAN    3,231,305
COLLAPSIBLE COVER ASSEMBLY FOR VEHICLES
Filed Sept. 3, 1964    3 Sheets-Sheet 3
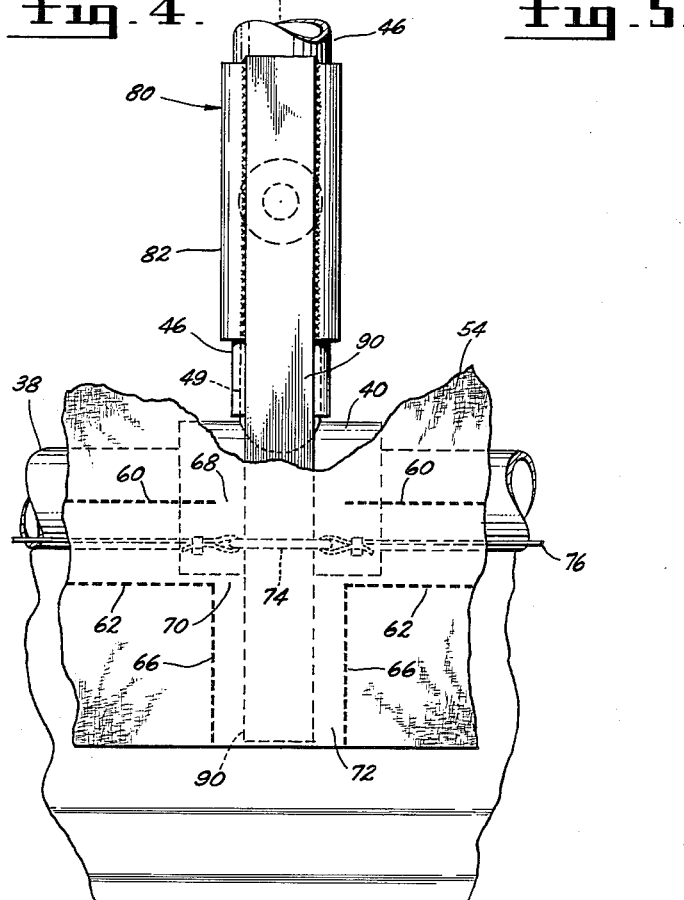
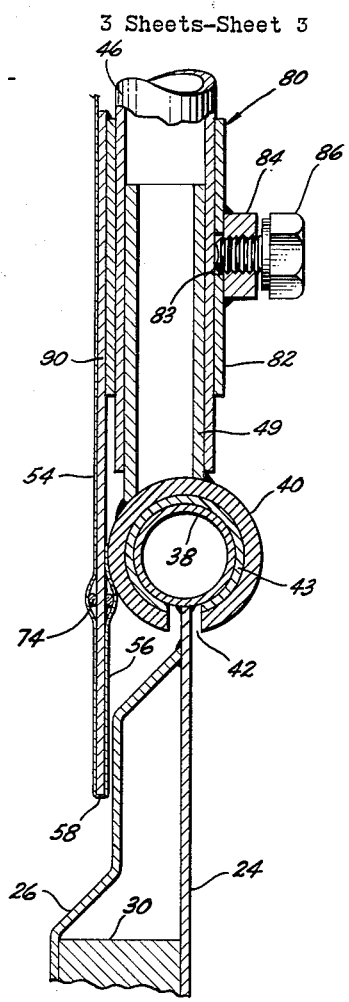
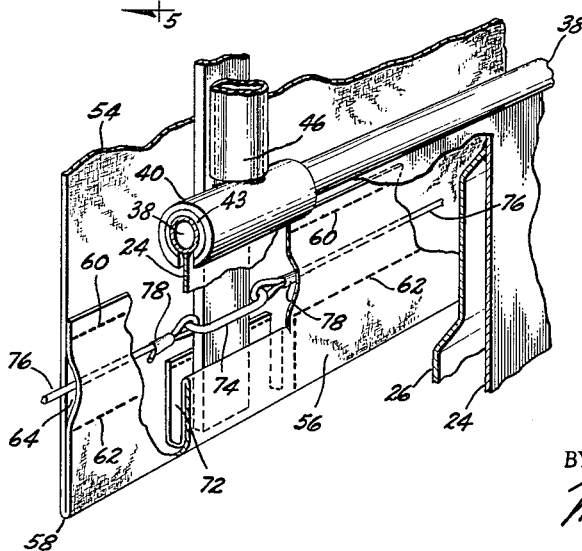
INVENTOR.
ELMER F. BECKMAN
BY
Meyers & Peterson
ATTORNEYS

United States Patent Office 3,231,305
Patented Jan. 25, 1966

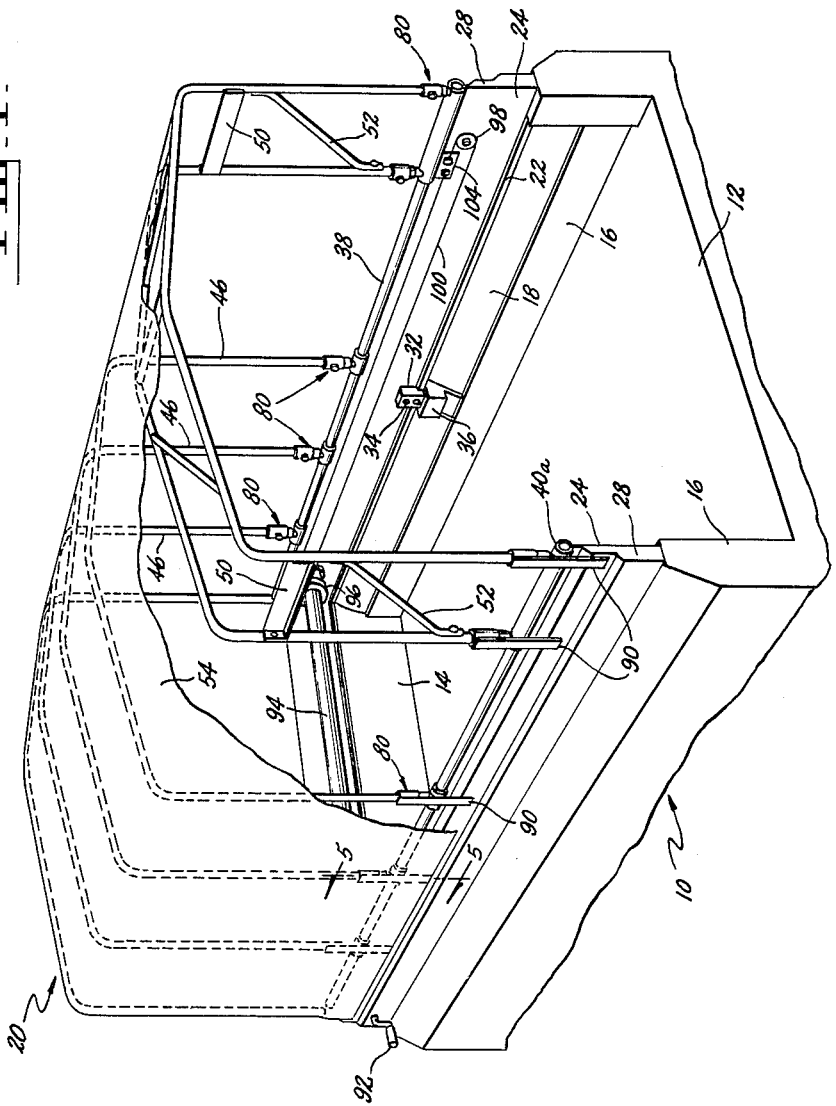

1

3,231,305
COLLAPSIBLE COVER ASSEMBLY FOR VEHICLES
Elmer F. Beckman, Clear Lake, Minn.
Filed Sept. 3, 1964, Ser. No. 394,238
20 Claims. (Cl. 296—100)

This invention relates generally to covers for vehicles, such as pickup trucks, and pertains more particularly to a cover therefor that can be collapsed and extended.

One object of the invention is to provide a cover or canopy assembly comprising only a few parts which can be quickly and easily collapsed or expanded as desired with a minimum amount of effort. In this regard, the invention has for an aim the provision of a tracking arrangement which imposes very little frictional drag and which is not apt to bind. In this regard, the invention envisages a pair of tubular rails having carrier sleeves encircling the rails in such a manner that dirt and other foreign matter will not be likely to interfere with the facile movement of the sleeves along the rails.

Another object of the invention is to provide a cover assembly which is completely self-contained and in which all of the support members, as well as the actuating mechanism itself, are enclosed by the cover when the cover is operated into an expanded condition. It is also within the contemplation of the invention to provide a unit that will be devoid of interfering lateral projections, either extending exteriorly or interiorly of the cover assembly.

Another object of the invention is to provide a cover assembly which compels the lower edge of the flexible canopy to fold outwardly from the tracking arrangement utilized when the cover is collapsed, thereby preventing the canopy from becoming entangled with any of the other parts constituting the assembly.

Another feature of the invention resides in the fact that the utilization of tubular rails extending along the upper edge of the side panels imparts substantial lateral rigidity as far as the overall assembly is concerned.

Still another object of the invention is to provide a cover assembly for vehicles which can be expanded without subjecting the fabric constituting the canopy to the tensional forces required to cause the extension. Stated somewhat differently, it is an aim of the invention to utilize cords or cables associated with the canopy which shoulder the loads rather than the fabric itself.

Yet another object of the invention is to provide a cover assembly which is exceedingly neat and attractive in appearance.

Further, the invention has for an additional object the provision of a cover assembly which is simple and durable, and inexpensive to produce, thereby encouraging its widespread use. The invention also has as a feature the fact that the structure can be quickly and easily assembled, as well as being readily attached to and detached from the vehicle body.

These and other objects and advantages of my invention will more fully appear from the following description, made in connection with the accompanying drawings, wherein like reference characters refer to the same or similar parts throughout the several views and in which:

FIGURE 1 is a perspective view of my cover assembly in a fully expanded conditions, a portion of the flexible canopy having been removed in order to show to better advantage the mechanical construction of the assembly;

FIGURE 2 is a perspective view similar to FIGURE 1 but with the cover assembly depicted in a partially collapsed condition;

FIGURE 3 is a fragmentary perspective view showing a fully collapsed condition, the view illustrating the salient parts in a proximal relationship with each other which

2 relationship is automatically assumed when the cover is fully collapsed;

FIGURE 4 is an elevational view showing a hold-down unit and the manner in which it engages the lower portion of the flexible canopy;

FIGURE 5 is a sectional view taken in the direction of line 5—5 in FIGURES 1 and 4, and FIGURE 6 is a fragmentary view in perspective looking outwardly from the interior of the assembly, portions of the construction being broken away and in section in order to illustrate the tracking arrangement and also to some extent to indicate the role played by a particular hold-down unit.

Referring now to FIGURES 1 and 2, it will be observed that a truck body 10 has been selected for the purpose of exemplifying the present invention. The truck body is of conventional construction and includes a floor 12, a front wall 14, and side walls 16 which flare outwardly at 18. Although not pictured, it will be understood that the cab of the vehicle is immediately forward of the front wall 14.

The cover assembly illustrating my invention has been generally denoted by the reference numeral 20. In the form shown, the assembly 20 includes a pair of horizontal panels 22 at each side. Projecting upwardly from each panel 22 is what will be termed an inner panel 24 and an outer panel 26, the outer panel being configured so as to engage the inner panel 24 along a line somewhat beneath the upper edge thereof. While it is contemplated that the panels will be metal and therefore welded together, obviously other panel arrangements, such as wood, can be employed if desired. In the form shown, the panels 24, 26 have an end wall at 28, thereby closing the interior thereof. From FIGURE 5, it will be discerned that the space between the panels can be filled or partially filled with any suitable material, a portion of a plank 30 having been presented.

Although the plank 30 could be in the form of individual stakes which extend downwardly, or stakes which project from the truck body upwardly for reception in suitable sockets formed between the panels 24 and 26, the assembly 20 in the exemplary situation is attached or retained in proper juxtaposition with the side walls 16 through the agency of a plurality of stakes 32 which are merely attached by bolts 34 to the inner panel 24. The stakes 32 project downwardly and are received in sockets 36 which are secured to either the side walls 16 or the flared portions 18 thereof. Actually, the mode of attachment is relatively unimportant to a practicing of my invention. Thus, various arrangements could be resorted to in lieu of the stakes 32. Actually, only one stake 32 has been made visible in FIGURES 1 and 2, but it will be appreciated that any preferred number can be utilized, or as indicated above, other arrangements could be employed for the purpose of attaching the assembly 20 to the vehicle 10.

Continuing with the description of the assembly 20, it will be discerned that a track is provided by means of a pair of laterally spaced parallel tubular rails 38. Each of the rails 38 has an equal number of carrier sleeves 40, each formed with a downwardly facing slot 42 and a liner 43 as can be readily seen in FIGURE 5. For a purpose hereinafter made manifest, a relatively long carrier sleeve 40a is located at the rear of the assembly 20, such sleeves (there being one at each side) having a downwardly facing slot 42a as can be perceived from a close inspection of FIGURE 3.

At this time, attention is directed to a plurality of inverted U-shaped supports or bows of relatively thin stock, preferably on the order of No. 16 gauge. Each support or bow 44 is comprised of a pair of vertical side legs 46 and a bridging or connecting portion 48. The lower ends of the side legs 46 are telescoped over upstanding tubular posts 49 welded directly to the various carrier sleeves 40, 40a. Thus, the supports or bows 44 span the distance between the rails 38.

As can be seen from FIGURES 1–3, the two most rearwardly (actually those in the foreground as viewed in FIGURE 1) disposed supports or bows 44 have their lower ends connected to the relatively long sleeve 40a, there being a single such long sleeve 40a at each side of the assembly. Visible in FIGURES 1 and 2 are horizontal braces 50 and visible in FIGURES 1–3 are inclined braces 52. In this way, the two bows 44 at the rear of the assembly are trussed together and form a unit, the bracing providing the rigidity to withstand the longitudinal tension applied to the cover (referred to hereinafter) when extended. As will be better understood as the description progresses, the unit composed of the two rear supports or bows 44 plus the two relatively long sleeves 40a move in unison, there being no relative movement possible by reason of the trussing and also the mounting on single sleeves at each side.

A flexible canopy 54, such as canvas or plastic, overlies the various supports or bows 44, the canopy 54 serving as the covering medium. The canopy 54 is reversely folded at its lower margin, such a fold or hem being labeled 56 (see FIGURES 5 and 6). In this way, a looped bottom 58 is provided. Upper and lower horizontal stitching 60 and 62, respectively, retains the lower margin in its folded or hemmed state. Also, the space between the stitching 60, 62 forms a tunnel at 64 (see FIGURE 6). As clearly evident in FIGURE 4, parallel vertical stitching is shown at 66. The stitching 66 extends downwardly from what will be called unstitched gaps or intervals designated by the reference numerals 68, 70. More specifically, the hem 56 is cut and folded into a U-shaped configuration, as shown in FIGURE 6, to provide extra reinforcement and thus form a pocket 72. Actually, there will be a number of pockets there being one pocket 72 at each side for each of the supports or bows 44.

The formation of the tunnel 64 has been mentioned. It is within the tunnel, being subjacent the gap 68 (and hence, in registry with the upper end or entrance to the pockets 72), that a link 74 is placed. The link 74 in each instance is connected to cable or cord sections 76, the connection being through the agency of suitable clips 78 that are clinched onto the reversely turned or looped cord (or cable) ends. Thus, there is a link 74 maintained in registry with each pocket 72.

Referring now to the various hold-down units identified by the reference numeral 80, it will be observed that each unit 80 includes a sleeve 82. Radially formed in each sleeve 82 is a hole 83 having a nut 84 fixedly circumscribed thereabout, the various nuts being welded directly to the sleeves 82. The nuts 84 accommodate set screws 86 which when tightened bear against the vertical legs 46 belonging to the inverted U-shaped supports or bows 44. The hold-down unit 80 in each instance further includes a strip or tongue 90 welded to the sleeve 82. The strip or tongue 90 projects a considerable distance beneath the lower end of the sleeve 82 and is intended to be received in a particular pocket 72. The function of the various hold-down units 80 is to maintain the flexible canopy 54 taut and to hold the lower edge 58 snugly against panel 26, for the sleeves 82 can be individually adjustable up or down on the legs 46 in order to cause the lower ends of the strips or tongues 90 to abut against the looped bottom labeled 58 of the canopy 54. It will be noted that the screws 86 abut against the lower legs 46 of the bows 44; owing to the thinness of the bows 44 they are deformed or distorted sufficiently so as to be clamped to the posts 49 and thus assure that the assemblage 20 cannot be blown off the vehicle 10.

Considering now the operating mechanism employed to collapse and extend the cover assembly 20, it will be noted that a crank 92 is visible in each of FIGURES 1–3. Additional pulleys 98 are mounted for rotation directly on the inner panel 24. Entrained about the pulleys 96, 98 is a cable 100, there being one such cable 100 at each side. A takeup pulley 102 (visible in FIGURES 2 and 3) can be employed so as to make the cables 100 tight enough to prevent slippage. A bracket 104 projects downwardly from each of the relatively long sleeves 40a and by means of bolts 106 the free ends of the cable 100 in each instance are secured to the brackets 104. In this way, the sleeves 40a are actuated forwardly or rearwardly along the rails 38, depending upon which way the crank 92 is turned.

Having presented the foregoing information, the manner in which my cover assembly is used and operated should be easily understood. Assuming that the cover assembly is in its fully expanded or extended condition, this being the condition pictured in FIGURE 1, when the crank 92 is rotated in the proper direction to cause the assembly to be collapsed, there is a tensional pull on the cables 100 so as to move the sleeves 40a forwardly along the rails 38. Sufficient movement of the sleeves 40a will cause their forward ends to abut the sleeves 40 that are spaced ahead. This abutting relationship is shown in FIGURE 2. Continued pull on the sleeves 40a will cause the various sleeves 40 to be progressively moved forwardly until all of the sleeves are abutting each other as is shown in FIGURE 3. This results in a fully collapsed condition of the canopy 54. It will be appreciated that the two rearmost supports or bows 44 move in unison with each other at all times and this provides a stabilized action, for the sleeves 40a are of sufficient length so that they do not tend to cock or bind on the rails 38 as they are advanced therealong. Also, owing to the braced or trussed condition of the rear two bows 44, adequate support is provided to withstand the longitudinal forces required to maintain the canopy 54 sufficiently taut so as to minimize flutter.

Also, it will be discerned that the flexible canopy 54 is collapsed or folded so that the material constituting the canopy is folded outwardly in the vicinity of its lower edge (see FIGURE 3), although the upper region at each side folds inwardly between those bows 46 which are movable relative to each other. Because of this, there is no chance for the individual folds to become entangled in the various moving parts.

When it is desired to expand or extend the cover, the crank 92 is rotated in an opposite direction and the reverse of the procedure just described occurs. It should be taken into account, though, that no strain on the canopy 54 is experienced because of the existence of the cable or cord sections 76. Thus, the load when the assembly is extended is carried by the flexible cables or cord sections 76 through the intermediary of the various links 74. It will be appreciated that the links 74 are so oriented that the strips or tongues 90 on the hold-down units 80 project therethrough. Thus, the fabric constituting the canopy 54 is relieved of any responsibility as far as transmitting the forces required for extending the assembly. Of course, when the assembly is collapsed, then the load is borne by the individual carrier sleeves 40, 40a through the abutting relationship that has been previously mentioned as being experienced (see FIGURE 3 for this relationship).

It will be understood that the flexible canopy 54 can always be kept in a taut condition because the sleeves 82 can be adjusted vertically along the side legs 46, the set screw 86 merely being tightened when the various strips or tongues 90 are forced downwardly with sufficient pressure against the looped bottoms 58 of the pockets 72.

When the stakes 32 are employed, it will be appreciated that the assembly 20 can be readily lifted from the vehicle 10 whenever it is necessary or desirable to do so. By the same token, it can be reattached to the vehicle without difficulty. Thus, it will be recognized that no special fastening means need be employed in order to utilize the assembly 20. In other words, the attachment can be effected quite simply and in a straightforward manner.

It will be appreciated that my cover assembly will have especial utility when hauling various loads requiring protection from the weather. Yet the assembly can be quickly collapsed if oversize loads are to be carried or to facilitate loading and unloading.

It will, of course, be understood that various changes may be made in the form, details, arrangements and proportions of the parts without departing from the scope of my invention as set forth in the appended claims.

What is claimed:

1. A collapsible cover assembly for vehicles comprising:
   (a) track means including a pair of parallel tubular rails;
   (b) a pair of upright panels adapted to be supported at the opposite sides of the vehicle,
   (c) said tubular rails being contiguously secured along the upper edges of said panels so that each rail becomes an integral unit with the panel to which it is secured,
   (d) a plurality of carrier sleeves slidably encircling each of said rails,
   (e) each sleeve being of unitary construction and having a downwardly facing slot of fixed width for accommodating the upper marginal portion of the particular panel with which it is associated;
   (f) a plurality of bow members spanning the lateral distance between rails,
   (g) said bow members having their ends supported on one said carrier sleeves and each sleeve having a length such that it projects forwardly and rearwardly from the bow member end with which it is associated, and
   (h) a flexible canopy having spaced portions thereof anchored to said bow members,
   (i) whereby when said carrier sleeves are moved along said rails in one direction said canopy will be collapsed when moved in an opposite direction said canopy will be expanded.

2. A collapsible cover assembly in accordance with claim 1 including:
   (a) means mounting the two bow members nearer one end of said track means in a fixedly spaced apart relationship.

3. A collapsible cover assembly in accordance with claim 2 in which:
   (a) said two bow members have their ends supported on a single carrier sleeve on one rail and to a single carrier sleeve on the other rail.

4. A collapsible cover assembly in accordance with claim 3 including:
   (a) a plurality of brace elements having their ends fixedly attached at locations above the lower ends of said two bow members so as to maintain said bow members in said spaced apart relationship interconnecting said two bow members.

5. A collapsible cover assembly in accordance with claim 1 including:
   (a) means projecting downwardly from said bow members into engagement with said spaced canopy portions to provide said anchoring.

6. A collapsible cover assembly in accordance with claim 5 in which:
   (a) said last-mentioned means are vertically adjustable on said bow members.

7. A collapsible cover assembly for vehicles comprising:
   (a) track means including a pair of parallel tubular rails;
   (b) a pair of upright panels adapted to be supported at the opposite sides of the vehicle;
   (c) said tubular rails being secured along the upper edges of said panels;
   (d) a plurality of carrier sleeves slidably encircling each of said rails,
   (e) each sleeve having a downwardly facing slot for accommodating the upper marginal portion of the particular panel with which it is associated;
   (f) a plurality of bow members spanning the lateral distance between rails,
   (g) said bow members having their ends supported on said carrier sleeves,
   (h) a flexible canopy having spaced pockets along its lower edge, and
   (i) a hold-down unit for each pocket mounted for vertical adjustment on said bow members,
   (j) each hold-down unit having a downwardly projecting strip receivable in a pocket.

8. A collapsible cover assembly in accordance with claim 7 in which:
   (a) each sleeve has an upwardly directed post,
   (b) said bow members being of relatively thin tubular stock and telescoped over said posts, and
   (c) each hold-down unit including a set screw for deforming said bow members against said posts to fasten said bow members to said sleeves.

9. A collapsible cover assembly in accordance with claim 7 including:
   (a) a link member secured across the upper end of each pocket for the reception of said strips.

10. A collapsible cover assembly in accordance with claim 9 including:
    (a) a plurality of cable sections connected between said link members.

11. A collapsible cover assembly in accordance with claim 10 including:
    (a) cable means connected to the corresponding carrier sleeves nearer the rear end of said track means for moving said last-mentioned sleeves in a forward direction with respect to the vehicle to collapse said canopy and in a rearward direction to expand said canopy.

12. A collapsible cover assembly for vehicles comprising:
    (a) track means including a pair of parallel rails;
    (b) a plurality of carrier sleeves slidably engaging said rails;
    (c) an upstanding post member on each of said sleeves;
    (d) a plurality of tubular bow members having their lower ends telescoped over said post members;
    (e) a plurality of sleeves encircling said tubular bow members;
    (f) a set screw extending through each last-mentioned sleeve and abutting the portions of a bow member within that sleeve;
    (g) a flexible canopy, and
    (h) means on each of said last-mentioned sleeves for anchoring portions of said canopy to said last-mentioned sleeves.

13. A collapsible cover assembly in accordance with claim 12 in which:
    (a) said tubular bow members are of relatively thin stock so that said set screws when tightened sufficiently will deform same against said post members to clamp said bow members in place.

14. In combination:
    (a) a flexible cover;
    (b) support means for said cover, and
    (c) a hold-down unit having a sleeve surrounding a portion of said support means and provided with a downwardly projecting straight flat strip engageable with a pocket portion formed in said cover.

15. In combination with a flexible canopy and a plurality of individual movable bow members on which said canopy is supported, said bow members being guided for longitudinal movement along a pair of parallel rails disposed along each side of a vehicle to be covered:
    (a) a hold-down unit mounted for vertical adjustment at each side of each bow member,
    (b) each hold-down unit having a downwardly projecting straight flat strip engageable with said canopy for maintaining said canopy taut.

16. The combination set forth in claim 15 in which:
    (a) said bow members include spaced parallel legs, and
    (b) said hold-down units include sleeve members slidable surrounding said legs.

17. The combination set forth in claim 16 including:
    (a) set screws threadedly carried by said sleeve members for engaging said legs for retaining said hold-down units in a vertically adjusted position so as to maintain said canopy taut.

18. The combination set forth in claim 15 in which:
    (a) said canopy is provided with spaced pockets for the reception of the ends of said strips.

19. The combinaiton set forth in claim 18 in which:
    (a) said pockets are formed by a reverse marginal fold of said canopy adjacent its lower edges.

20. The combination set forth in claim 19 including:
    (a) vertically extending stitching at the sides of said pocket and two vertically spaced rows of horizontal stitching extending between said pockets.

References Cited by the Examiner

UNITED STATES PATENTS

| | | | |
|---|---|---|---|
| 1,263,759 | 4/1918 | Hanaway | 296—105 |
| 2,239,888 | 4/1941 | Forrester | 296—105 |
| 2,516,713 | 7/1950 | McClure | 296—104 X |
| 2,531,735 | 11/1950 | Jones | 135—34 |
| 2,589,687 | 6/1952 | Griffin | 135—34 X |
| 2,670,988 | 3/1954 | Cook | 296—105 |
| 2,774,623 | 12/1956 | Owen | 296—104 |
| 2,817,344 | 12/1957 | Teeter | 296—100 X |

FOREIGN PATENTS

| | | |
|---|---|---|
| 550,510 | 12/1957 | Canada. |
| 300,356 | 11/1928 | Great Britain. |
| 115,841 | 6/1926 | Switzerland. |

BENJAMIN HERSH, *Primary Examiner.*
A. HARRY LEVY, *Examiner.*